July 24, 1934.  A. STORM ET AL  1,967,454
MEANS FOR ADJUSTING THE CUTTERS OF BORING MACHINES AND THE LIKE
Filed Nov. 27, 1931
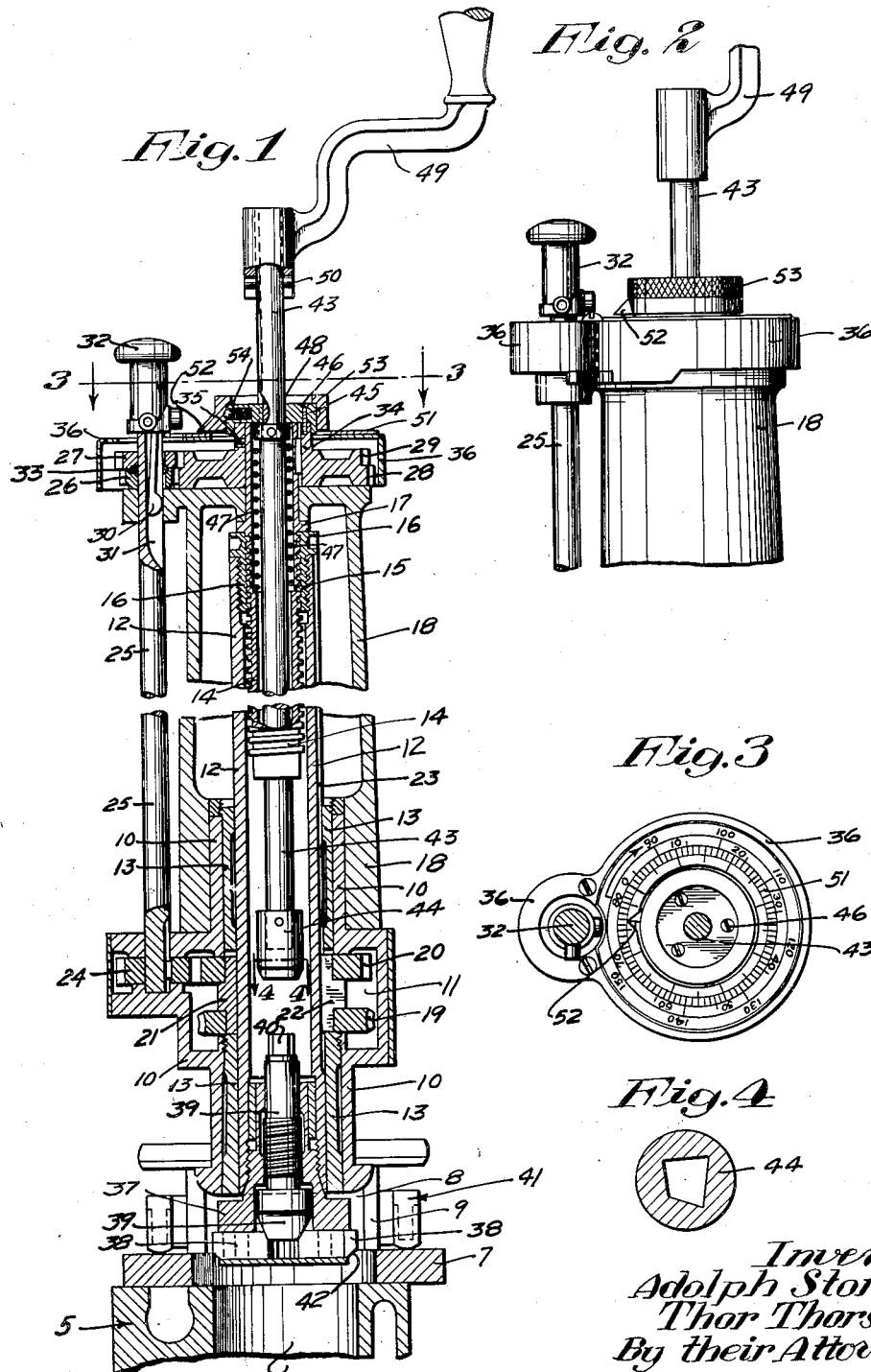

Patented July 24, 1934

1,967,454

UNITED STATES PATENT OFFICE 1,967,454

MEANS FOR ADJUSTING THE CUTTERS OF BORING MACHINES AND THE LIKE

Adolph Storm and Thor Thorsen, Minneapolis, Minn., assignors to Storm Manufacturing Co., Inc., Minneapolis, Minn., a corporation of Minnesota Application November 27, 1931, Serial No. 577,475

3 Claims. (Cl. 77—2)

This invention relates to boring machines and the like and has for its object the provision of simple and highly efficient means for adjusting the cutters thereof.

While the invention is intended for general use it is especially well adapted for use in connection with boring machines of the type disclosed and broadly claimed in the pending application of Adolph Storm "Boring machine" filed September 14, 1929, under Serial Number 392,649.

Heretofore it has been necessary when re-boring the cylinders in an engine block or the like to remove the machine from the block, remove its cutter head, adjust the cutters to the size of the cut to be made, replace cutter head and again center the machine for each cut to be made through its cylinders.

By the use of this invention, when embodied in a boring machine or the like, it is possible to adjust the cutters of the machine from the exterior thereof without removing the machine from the engine block or the cutter head from the machine thus increasing the accuracy of the machine and reducing the work necessary and time required to re-bore a cylinder.

To the above end, generally stated, the invention consists of the novel devices and combinations of devices hereinafter described and defined in the claims.

In the accompanying drawing, which illustrates the invention, like characters indicate like parts throughout the several views.

Referring to the drawing:

Fig. 1 is a fragmentary view principally in central vertical section illustrating a boring machine having the invention embodied therein;

Fig. 2 is a fragmentary side elevation of the upper portion of the parts shown in Fig. 1;

Fig. 3 is a view partly in plan and partly in horizontal section taken on the line 3—3 of Fig. 1; and Fig. 4 is a detail view in section taken on the line 4—4 of Fig. 1, on an enlarged scale.

A fragment of an engine cylinder block is illustrated in the drawing and indicated as an entirety by the numeral 5 with the exception of its cylinders 6, only one of which is shown, and on which block the boring machine, in which the invention is embodied, is mounted.

The boring machine illustrated has an annular base 7 which rests directly on the top of the engine block 5 and support said machine perpendicular thereto. Said base 7 is provided with a raised cylindrical central portion 8 provided with a plurality of circumferentially spaced sight openings 9. Integral with the base portion 8 is a cylindrical main housing 10 that is circumferentially expanded, intermediate of its ends, to afford a gear compartment 11.

A boring bar 12 is turnably mounted in two bearings 13 in the housing 10, one of which is below the gear compartment 11 and the other of which is above the same.

Extending axially into the boring bar 12, from the top thereof, is a tubular feed screw 14 to which a nut-acting member 15 is applied for rotating the same. This nut-acting member 15 is secured in the upper end of the boring bar 12 by screw-threads and provided with an expanded annular head 16 which engages the upper end of the boring bar 12 as a stop and limits the turning movement of said member into the boring bar 12 and holds the same against the turning action of the feed screw 14 therein. Formed in the head 16 are circumferentially spaced seats for a tool designed to screw the nut-acting member 15 into the boring bar 12 or remove the same therefrom.

The feed screw 14 is provided, intermediate of its ends, with a fixed collar 17 and above said collar with an unthreaded portion that is journaled in a bearing therefor in the closed top of a cylindrical auxiliary housing 18, the lower end portion of which is telescoped onto the upper portion of the main housing 10, with a tight fit, which holds the same from turning about the axis thereof, and supported on the top of the compartment 11. The collar 17 on the feed screw 14 engages a boss on the under side of the top of the auxiliary housing 18 and prevents lifting movement of said feed screw in its bearing in the top of the auxiliary housing 18 and which collar also affords a stop to limit the retracting or lifting movement of the boring bar 12.

Within the gear compartment 11 is a worm gear 19 and a spur gear 20 mounted on a hub 21 with the former below the latter. These gears 19 and 20 are secured by a key 22 to the hub 21 for rotation therewith and which hub is mounted on the boring bar 12 with freedom to permit axial movement of said bar therethrough. The key 22 also extends into a long key-way 23 in the boring bar 12 and secures said bar to the hub 21 for rotation therewith but at the same time permits the required axial movement of the boring bar 12 therethrough. Opposing bosses on the top and bottom of the gear compartment 11 are engaged by the gears 19 and 20 and hold the hub 21, and hence, said gears against axial movement in said housing.

The boring bar 12 is rotated by an electric motor and connections, not shown, except the worm gear 19, which forms a part of said connections. During rotation of the boring bar 12, endwise feeding movement is imparted thereto, under the action of the feed screw 14, by the following connections including the spur gear 20 with which a spur pinion 24 meshes. This spur pinion 24 is keyed to the lower end of an upright shaft 25 journaled at its lower end portion in bearings in the top and bottom of the gear compartment 11 outward of the auxiliary housing 18. The upper end portion of the shaft 25 is journaled in a bearing on the top of the auxiliary housing 18. The shaft 25 is connected to the feed screw 14 by a variable speed transmission mechanism which includes a pair of differential spur pinions 26 and 27 loosely journaled on said shaft for independent rotation and mesh, respectively, with a pair of differential spur gears 28 and 29 keyed to the feed screw 14.

A sliding key 30 is mounted in a key-way 31 in the shaft 25 for movement from neutral to a position in which it connects either one of the pinions 26 and 27 to the shaft 25. This key 30 is formed on the lower end of a long body, which is attached to a key shift hand-piece 32 slidably mounted on the upper end of the shaft 25. A cam-acting collar 33 on the shaft 25 between the pinions 26 and 27 is provided to cam the key 30 out of the key-ways in the pinions 26 and 27 during endwise movement of said key.

The pinions 26 and 27 and the gears 28 and 29 are supported on the top of the auxiliary housing 18 and the hub 34 of the gears 28 and 29 is extended thereabove and rigidly secured to the feed screw 14 by a set-screw 35, which holds said feed screw suspended in the boring bar 12.

Obviously, the ratio of the pinion 26 and gear 28 is such as to turn the feed screw 14 at a relatively slow speed and the ratio of the pinion 27 and gear 29 is such as to turn said feed screw at a relatively fast speed.

A casing 36 for the pinions 26 and 27 and the gears 28 and 29 is supported from the auxiliary housing 18 and the hand-piece 32 is thereabove as well as the upper end portion of the hub 34.

A cutter head 37 is mounted on the lower end of the boring bar 12 and detachably secured thereto by screw-threads. This cutter head 37 is provided with a plurality of radially adjustable cutters 38 and a pilot 39 for simultaneously adjusting said cutters. Said pilot 39 has screw-threaded engagement with the cutter head 37, extends axially into the boring bar 12 above the cutter head 37 and has on its upper end a coupling head 40, that is a trapezium in cross section.

A clamp, indicated as an entirety by the numeral 41, is provided for rigidly securing the machine to the engine block 5 with the cutter head 37 centered in respect to one of its cylinders. For the purpose of this case, it is not thought necessary to further describe or illustrate the clamp 41 or the centering of the cutter head 37 except to note that the lower outer edges of the cutters 38 are beveled at 42. To center the machine the cutters 38 are projected so that their beveled surfaces 42 rest on the upper edge of the cylinder 6 and the boring bar 12 adjusted to lift the machine with its base 7 just out of contact with the block 5 with said machine supported by its cutter 38 so that their beveled surfaces 42, which automatically position the machine and center the cutter head 37 in respect to the cylinder 6. As previously stated, it has heretofore been necessary to re-center the machine each time a cut was to be made through the cylinder, which required the removal of the machine from the block and the removal of the cutter head from the boring bar in order to adjust its cutters.

The parts thus far described are substantially identical with corresponding parts of the application heretofore identified with the exception that in the present application the feed screw is tubular, the pilot for the cutter head has a novel coupling head and certain other minor details.

Referring now in detail to the invention which permits the cutters 38 to be adjusted for different cuts without disturbing the machine after the same is once secured to an engine block and its cutter head centered in respect to one of its cylinders.

Extending axially into the tubular feed screw 14, from the upper end thereof, is a shaft 43 having on its lower end a socketed coupling member 44 adapted to be inserted over the pilot coupling head 40 by an endwise projecting movement of said shaft to connect the pilot 39 for rotation therewith. The socket in the coupling member 44 has the same cross section as the coupling head 40 so as to interlock therewith in only one predetermined rotated position of the shaft 43 in respect to the cutter head 37. A hub or driven clutch member 45 is keyed to the shaft 43 for rotation therewith but with freedom to permit axial movement of said shaft therethrough. The under side of the hub 45 is recessed to receive the upper end of the hub 34 and is rigidly secured thereto by one or more screws 46.

Encircling the shaft 43 is a coiled spring 47 compressed between an internal shoulder on the feed screw 14 and a collar 48 fixed to the shaft 43 below the hub 45 and which spring normally holds the shaft 43 raised or retracted with the collar 48 engaging the hub 45 as a stop to limit the lifting movement of the shaft 43.

A hand-crank 49 applied to the upper end of the shaft 43 is provided for turning said shaft, and hence, the feed screw 14, which is connected thereto by the hub 45 and gears 28 and 29. This hand-crank 49 is detachably applied to the shaft 43 by a pin and notch connection 50. Obviously, when the key 30 is in neutral the shaft 43 and feed screw 14 may be simultaneously turned by the hand-crank 49 to retract or project the boring bar 12. When the key 30 connects either of the pinions 26 and 27 to the shaft 25 the feed screw 14 will be automatically turned in the proper direction to project the boring bar 12 and at which time the shaft 43 will be turned with the feed screw 14 by its connection thereto through the hub 45.

Rigidly secured to the top of the casing 36 is a dial 51 graduated to represent thousandths of an inch and cooperating with said dial is a pointer 52 on a collar or driving clutch member 53 and projects radially therefrom. This collar 53 is turnably mounted on the hub 45 for circumferential adjustment and is held against downward movement thereon by an internal shoulder. A spring-pressed clutch ball 54, mounted in a radial seat in the periphery of the collar 53, projects into an annular race in the collar 53 and yieldingly and frictionally holds said collar where circumferentially adjusted on the hub 45.

To make a cut through the cylinder 6 after the machine has been centered and clamped onto the block 5, and at which time the boring bar 12 is retracted with its cutter head 37 above the block 5, the cutters 38 are retracted so as to enter said cylinder and the boring bar 12 lowered to position said cutters in the cylinder. The shaft 43 is next pressed axially downward to connect the coupling members 40 and 44 and thereafter the hand-crank 49 operated to project the cutters 38 against the wall of the cylinder. Pressure on the shaft 43 is then released to permit the compressed spring 47 to lift the shaft 43 and separate the coupling members 40 and 44. The hand-crank 49 is then operated to turn the feed screw 14 in the nut-acting member 15 and lift the boring bar 12 and position the cutters 38 above the block 5. The collar 48 is then turned on the hub 45 to position its pointer 52 at zero on the dial 51 or the reading on said dial at the pointer 52 taken. During this adjustment of the machine, the key 30 is, of course, in neutral. The shaft 43 is then again depressed to connect the coupling members 40 and 44 and the hand-crank 49 operated to turn the pilot 39 and force its conical head between the cutters 38 and project the same. During this adjustment of the cutters 38, the pointer 52 is turned in respect to the dial 51 and when it has reached a point on the dial 51 indicating the number of thousandths to be made by the next cut, the turning movement of the pilot 39 is stopped and the hand-crank 49 released thereby causing the automatic separation of the coupling members 40 and 44.

With the cutters 38 positioned to make the desired cut through the cylinder, the hand-piece 32 is manipulated to move the key 30 into interlocking engagement with each of the pinions 26 or 27 to cause an automatic feed of the boring bar 12 during its rotation by the electric motor.

During the automatic feed of the boring bar 12, the pointer 52 is moved out of its set position in respect to the dial 51 so that each time a cut is to be made through the cylinder, the same procedure must be followed in adjusting the cutters to the wall of the cylinder and thereafter operate the boring bar 12 to lift the same above the cylinder, rest the pointer 52 in respect to the dial 51 by turning the collar 53 on the hub 45, moving the hand-crank 49 to project the cutters to the desired cut, which is indicated by the movement of the pointer 52 on the dial 51, and then cause the machine to operate in the customary manner to produce cutting and feeding action.

The sight openings 9 in the machine permit the operator to watch the cutters 38 during the centering of the machine and the adjustment of said cutters onto the wall of a cylinder, the adjustment thereof for a predetermined cut and the cutting action thereof upon entering the cylinders.

From the above description it is evident that after the machine is centered and clamped onto an engine block, any desired number of cuts may be made and the cutters adjusted from the exterior of the machine without disturbing the machine in respect to the block on which it is centered and secured.

What we claim is:

1. In a machine of the class described, a hollow boring bar mounted for compound rotary and axial movements and provided at one end with an adjustable cutter, means in the boring bar for adjusting the cutter, means for rotating the boring bar, a tubular feed screw extending axially into the boring bar from the other end thereof and having threaded engagement therewith, said feed screw being held against axial movement with respect to the boring bar, means actuated by the rotary movement of the boring bar for rotating the feed screw, manually-operated means for feeding the boring bar axially or for operating the cutter-adjusting means, said manually-operated means includes a rotatable shaft that extends axially through the feed screw and is connected thereto for common rotation therewith but with freedom for axial movement in respect thereto, means normally holding the shaft retracted, and a separable coupling constructed and arranged to connect the shaft to the cutter-adjusting means by a projecting movement of the shaft.

2. The structure defined in claim 1 which further includes an indicator mounted for circumferential adjustment about the axis of the feed screw for cooperation with a relatively fixed part on the machine, and means normally holding the indicator for common rotary movement with the feed screw.

3. In a machine of the class described, a hollow boring bar mounted for compound rotary and axial movements and provided with an adjustable cutter, means in the boring bar for adjusting the cutter, means for rotating the boring bar, a feed screw member for feeding the boring bar axially, driving connections including a clutch for rotating the feed screw member, an operating rod extending into the boring bar and keyed to the feed screw member for common rotation therewith but with freedom for relative axial movement, means by which the operating rod may be manually rotated, a normally released coupling for connecting the operating rod to the cutter-adjusting means by an axial movement of said rod when in a predetermined relative rotated position, an indicator for use in setting the cutter comprising a dial and a cooperating pointer, one of which is normally held for rotation with the operating rod but with freedom for relative circumferential adjustment and the other of which is relatively fixed with respect to the rotation of said rod.

ADOLPH STORM.
THOR THORSEN.